(12) United States Patent
Kim et al.

(10) Patent No.: US 9,142,813 B2
(45) Date of Patent: Sep. 22, 2015

(54) SECONDARY BATTERY

(71) Applicant: Samsung SDI Co., Ltd., Yongin-si, Gyeonggi-do (KR)

(72) Inventors: Dae-Kyu Kim, Yongin-si (KR); Takao Abe, Yongin-si (KR)

(73) Assignee: Samsung SDI Co., Ltd., Yongin-Si (KR)

( * ) Notice: Subject to any disclaimer, the term of this patent is extended or adjusted under 35 U.S.C. 154(b) by 138 days.

(21) Appl. No.: 13/839,650

(22) Filed: Mar. 15, 2013

(65) Prior Publication Data
US 2014/0193679 A1 Jul. 10, 2014

(51) Int. Cl.
*H01M 2/12* (2006.01)
*H01M 2/02* (2006.01)

(52) U.S. Cl.
CPC ............ *H01M 2/1241* (2013.01); *H01M 2/023* (2013.01)

(58) Field of Classification Search
CPC combination set(s) only.
See application file for complete search history.

(56) References Cited

U.S. PATENT DOCUMENTS

| 2008/0182159 A1* | 7/2008 | Mitani et al. ................. 429/56 |
| 2010/0136388 A1 | 6/2010 | Kim et al. |

FOREIGN PATENT DOCUMENTS

| KR | 10-2009-0105547 A | 10/2009 |
| KR | 10-2010-0020071 A | 2/2010 |
| KR | 10-2010-0062886 A | 6/2010 |

* cited by examiner

*Primary Examiner* — Gregg Cantelmo
(74) *Attorney, Agent, or Firm* — Knobbe Martens Olson & Bear LLP

(57) ABSTRACT

A secondary battery includes an electrode assembly having a first electrode plate, a second electrode plate and a separator interposed between the first and second electrode plates; a lower case accommodating the electrode assembly therein; and a cap assembly sealing the lower case. In the secondary battery, the lower case has the electrode assembly and a vent portion, and includes a surface facing the cap assembly. The vent portion includes an intersecting portion formed inside the surface, first and second curved portions curved to extend from the intersecting portion, and an extending portion extended in a straight line from the intersecting portion. The thickness of the intersecting portion includes the minimum thickness of the surface.

14 Claims, 4 Drawing Sheets

SECONDARY BATTERY

CROSS-REFERENCE TO RELATED APPLICATIONS

This application claims priority to and the benefit of Korean Patent Application No. 10-2013-0001166, filed on Jan. 4, 2013, in the Korean Intellectual Property Office, the entire content of which is incorporated herein by reference.

BACKGROUND

1. Field

The disclosed technology relates to a secondary battery, and more particularly, to a secondary battery having a pressure release vent for improved safety.

2. Description of the Related Technology

In general, a secondary battery is a battery which can be charged and discharged many times. As the electronics, communications and computer industries have developed, demands for secondary batteries for use as power sources of portable devices have increased. Studies have been conducted in many fields in order to improve the performance and safety of such batteries.

Requirements of miniaturization and high capacity for a secondary battery have been increased. The size of many secondary batteries has increased in order to increase power storage capacity. However, as a secondary battery is miniaturized, its safety from avoiding such conditions as thermal runaway becomes problematic. Where a secondary battery is used as a power source of an external electronic device, more serious problems may arise due to the synergy effect of the device.

SUMMARY OF CERTAIN INVENTIVE ASPECTS

According to an aspect of the present invention, there is provided a secondary battery, including: an electrode assembly having a first electrode plate, a second electrode plate and a separator interposed between the first and second electrode plates; a lower case accommodating the electrode assembly therein; and a cap assembly sealing the lower case, wherein the lower case surrounds the electrode assembly, and includes a surface facing the cap assembly, wherein the vent portion includes an intersecting portion formed on the surface, first and second curved portions that are formed to extend from the intersecting portion, and an extending portion extended in a line from the intersecting portion, and wherein the thickness of the intersecting portion has the minimum thickness of the surface.

The first and second curved portions are extended toward the outer perimeter of the surface from the intersecting portion, and wherein, the first and second curved portions are curved so that ends of the first and second curved portions face each other while being spaced apart from each other.

An end of the extending portion may be extended toward the opposite direction to the ends of the first and second curved portions.

The intersecting portion and the extending portion are formed to correspond to a center line of the surface.

The first and second curved portions are formed to have a pair of shapes corresponding to each other with the center line interposed therebetween.

The secondary battery is a cylindrical secondary battery. The outline of the surface forms an outer circle, and the closed curve obtained by connecting the end of the extending portion and the ends of the first and second curved portions corresponds to an inner circle. The inner circle is concentrically formed inside the outer circle and spaced apart from the outer circle at a predetermined distance.

The radius of the inner circle may be about half of that of the outer circle.

The thickness of the section of the first or second curved portion is formed to be inclined in the direction facing the end of the first or second curved portion from the intersecting portion.

The extending portion is formed in a straight line.

The extending portion is provided to overlap with the center line of the surface.

The thickness of the section of the extending portion is formed to be inclined in the direction facing the end of the extending portion from the intersecting portion.

The thickness of the end of the extending portion is formed to be substantially identical to that of the end of the first or second curved portion.

The thickness of the section of the extending portion is formed to be substantially identical to that of the intersecting portion.

The intersecting portion is formed at the substantial center of the surface.

The vent portion recessed inward is formed to the outer surface of the surface, and the inner surface of the surface is formed as a flat surface.

Another aspect of the disclosure provides a secondary battery, comprising a can; and a vent portion formed at the base of the can having a plurality of fracture lines meeting at a point and at least one of the fracture lines having a varying thickness.

The fracture lines include at least one straight line and at least two curved lines.

The vent portion is formed as a recess in the bottom surface of the can.

The secondary battery further comprises a cap assembly affixed to the top of the can.

The secondary battery further comprises positive and negative electrodes and an electrolyte.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION OF CERTAIN INVENTIVE EMBODIMENTS

Figure 1:
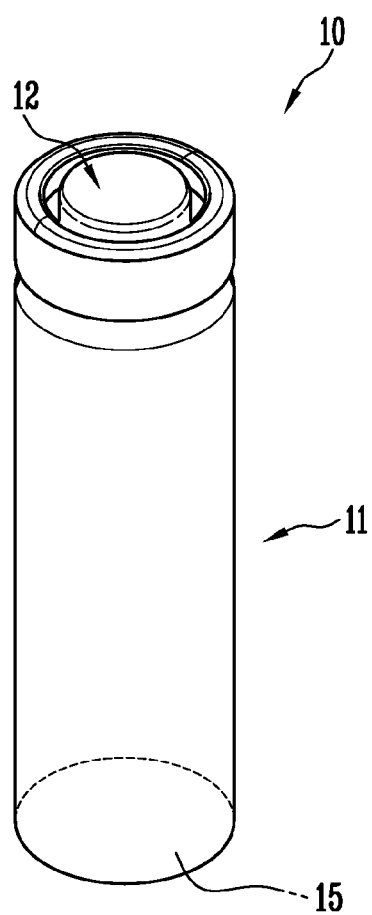
FIG. 1 is a perspective view of a secondary battery according to an embodiment of the disclosed technology.

In the following detailed description, only certain exemplary embodiments of the disclosed technology have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Figure 2:
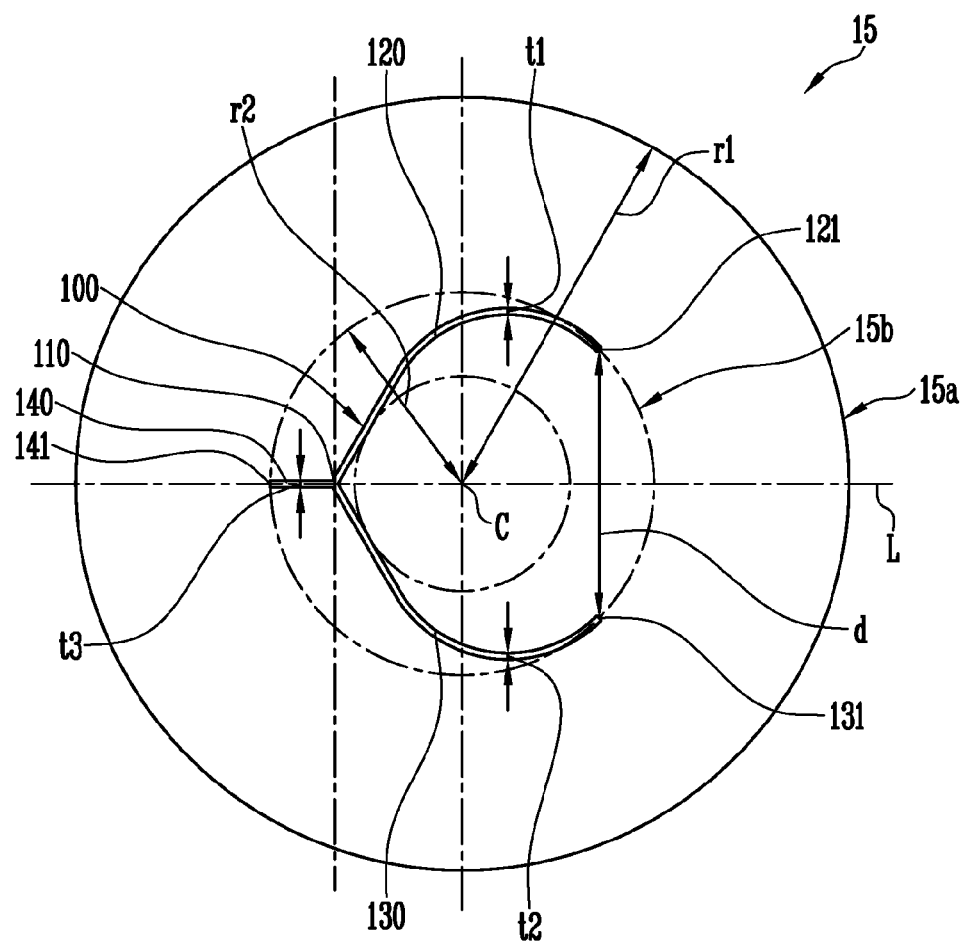
FIG. 2 is a view showing a surface of the secondary battery shown in FIG. 1.

FIG. 1 is a perspective view of a secondary battery according to an embodiment of the disclosed technology. FIG. 2 is a view showing a surface of the secondary battery shown in FIG. 1.

The secondary battery 10 according to this embodiment includes an electrode assembly having a first electrode plate, a second electrode plate and a separator interposed between the first and second electrode plates; a lower case 11 accommodating the electrode assembly therein; and a cap assembly 12 sealing the lower case 11. The lower case 11 includes a surface 15 facing the cap assembly 12 and having a vent portion 100. The vent portion 100 includes an intersecting portion 110 provided inside the surface 15, first and second curved portions 120 and 130 curved to extend from the intersecting portion 110, and an extending portion 140 extended in a straight line from the intersecting portion 110. The intersecting portion 110 is typically formed to have the minimum thickness of the surface 15.

In the secondary battery 10 according to this embodiment, the electrode assembly and an electrolyte are housed inside the lower case 11. The electrode assembly may be formed by winding or stacking the first and second electrode plates and the separate interposed between the first and second electrode plates. For example, the first electrode plate may be a positive electrode plate including a lithium compound, and the second electrode plate may be a negative electrode plate including carbon. The separator may be made of an insulative material having a plurality of pores. The separator allows the first and second electrode plates not to come in direct contact with each other. The separator enables the movement of the electrolyte, ions, etc. between the first and second electrode plates, thereby generating the flow of current in the electrode assembly. The first and second electrode plates are provided with first and second electrode tabs, respectively. The first and second electrodes are typically connected to the cap assembly 12 and the lower case 11, respectively. Since the first and second electrode tabs have different polarities, the cap assembly 12 and the lower case 11 have different polarities, and may be electrically connected to an external electronic device. In general, the lower case 11 has the shape of a can and is made of iron or aluminum or the like.

Commonly, secondary batteries include lithium, which is a material having high reactivity. The safety of the secondary battery may be compromised by placement in an abnormal state such as overcharge or overdischarge. Specifically, the internal pressure of the secondary battery increases due to an excessive side reaction of the lithium, and therefore, the secondary battery may have thermal runaway and/or can catch fire or explode. In order to prevent such problems, a safety member including a vent, circuit interrupt device (CID) and the like are included, for example, in a cap assembly of the secondary battery. Where the internal pressure of the secondary battery reaches a predetermined threshold before a fracture pressure causes an explosion, the vent, the CID and the like function to cut off the flow of current to/from the battery or to exhaust gas. Where safety devices are provided in only the cap assembly, the pressurized gas generated in the lower portion of the secondary battery may not be effectively exhausted.

The secondary battery according to the disclosed technology further includes a separate vent portion provided at the lower portion thereof, i.e., the surface opposite to the cap assembly. Thus, the gas can be effectively exhausted not only at the upper portion of the secondary battery, at which the cap assembly is positioned, but also at the lower portion of the secondary battery. By defining a minimum thickness, the vent portion is mechanically controlled to open under predefined high pressure situations. Therefore, the vent portion will not be damaged by an ordinary external impact.

The lower case 11 includes a surface 15 facing the cap assembly 12. A vent portion 100 is recessed inwardly on the outer side of the surface 15, and the inner side of the surface 15 is that faces the electrode assembly is substantially flat. The vent portion 100 can be formed at an approximately central portion of the surface 15. In various embodiments, the vent portion 100 includes an intersecting portion 100, and first and second curved portions 120 and 130 and an extending portion 140, which are extended in a radial shape from the intersecting portion 110. Together, these lines form a wishbone pattern.

The first and second curved portions 120 and 130 are extended toward the outside of the surface 15 from the intersecting portion 110, and ends 121 and 131 of the first and second curved portions 120 and 130 are spaced apart from each other. The first and second curved portions 120 and 130 may be curved so that the ends 121 and 131 of the first and second curved portions 120 and 130 are opposite to each other. For example, the first curved portion 120 may be curved clockwise to extend from the intersecting portion 110, and the second curved portion 130 may be curved counterclockwise to extend from the intersecting portion 110. Therefore, the ends 121 and the 131 of the first and second curved portions 120 and 130 may be provided at positions corresponding to each other while being spaced apart from each other at a predetermined spacing distance d. The spacing distance d between the ends 121 and the 131 of the first and second curved portions 120 and 130 can be maintained by being connected to the surface 15 even when the first and second curved portions 120 and 130 operate in the state in which the internal pressure of the secondary battery is a predetermined value or more.

An end 141 of the extending portion 140 may be extended toward the opposite direction of the first and second ends 121 and 131 of the first and second curved portions 120 and 130. The intersecting portion 110 and the extending portion 140 may be provided to correspond to the center line L of the surface 15. In this case, the first and second curved portions 120 and 130 may be provided to have a pair of shapes corresponding to each other with respect to the center line L interposed therebetween. For example, the first and second curved portions 120 and 130 may be provided to be symmetrical to each other with respect to the center line L interposed. The first and second curved portions 120 and 130 are provided to have shapes symmetrical to each other, and thus the vent portion 100 can be easily formed on the surface 15 of the secondary battery. Further, the operational pressure of the vent portion 100 can be efficiently controlled by such fracture lines.

For example, the secondary battery 10 according to various embodiments is cylindrical. As such, the outline of the surface 15 forms an outer circle 15a, and the closed curve obtained by connecting the end 141 of the extending portion 140 and the ends 121 and 131 of the first and second curved portions 120 and 130 correspond to an inner circle 15b. The inner circle 15b is concentrically formed inside the outer circle 15a, and thus, shares the center C with the outer circle 15a while being spaced apart from the outer circle 15a at a predetermined interval. For example, the radius r2 of the inner circle 15b can be about 0.5 (half) of the radius r1 of the outer circle 15a. That is, since the end 141 of the extending portion 140 and the ends 121 and 131 of the first and second curved portions 120 and 130 are provided on one circumference, the vertical direction obtained by connecting the end 141 of the extending portion 140 and the end 121 of the first curved portion 120 at the intersecting portion can be identical to that obtained by connecting the end 141 of the extending portion 140 and the end 131 of the second curved portion 130 at the intersecting portion 110. The width t1 or t2 of the first or second curved portion 120 or 130 can be identical to that t3 of the extending portion 140.

Figure 3:
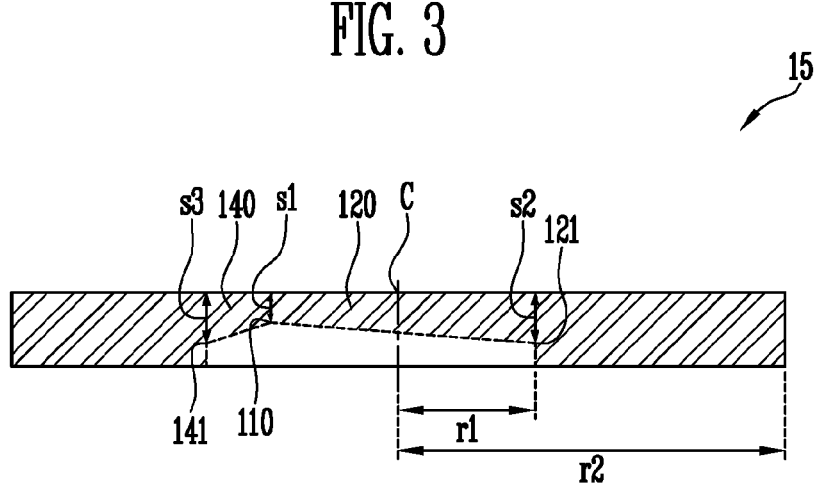
FIG. 3 is a view schematically showing a thickness gradient of a vent portion of the surface shown in FIG. 2.

FIG. 3 is a view schematically showing a thickness gradient (slope) of a vent portion of the surface shown in FIG. 2.

FIG. 3 is a cross-section view of the surface 15 taken through the centerline. Referring to FIG. 3, the depth of the first or second curved portion 120 or 130, which is recessed with respect to the outer surface of the surface 15, may have a gradient of varying thickness. For example, the thickness of the section of the first or second curved portion 120 or 130 may be provided to be inclined in the direction facing the end 121 or 131 of the first or second curved portions 120 and 130 from the intersecting portion 110. The extending portion 140 may be provided to have a straight line shape. The extending portion 140 may be provided to overlap with the center line L of the surface 15. In this case, the thickness of the extending portion 140 may be provided to be inclined in the direction facing the end 141 of the extending portion 140 from the intersecting portion 110. Therefore, the vent portion 100 may be further recessed inwardly from the environment, i.e., from the outer face of the surface 15. Thus, the degree of recess of the vent portion 100 is not constant; rather it varies has according to a gradient or slope.

That is, the first or second curved portion 120 or 130 may have a first thickness s1 that is thinnest at the intersecting portion 110. As the first or second curved portion 120 or 130 approaches the end 121 or 131 thereof from the intersecting portion 110, the thickness of the first or second curved portion 120 or 130 increases. Therefore, the first or second curved portion 120 or 130 may have a second thickness s2 at the end 121 or 131 thereof. In addition, the extending portion 140 may have the first thickness s1 that is thinnest at the intersecting portion 110. As the extending portion 140 approaches the end 141 thereof from the intersecting portion 110, the thickness of the extending portion 140 increases. Therefore, the extending portion 140 may have a third thickness s3 at the end 141 thereof. In this case, the third thickness s3 that is the thickness of the end 141 of the extending portion 140 can be substantially identical to the second thickness s2 that is the thickness of the end 121 or 131 of the first or second curved portion 120 or 130.

The secondary battery according to this embodiment includes the Y-shaped vent portion 100. In this case, at least one portion of the vent portion 100 may be curved. For example, in a case where the internal pressure of the secondary battery is a predetermined value, the vent portion 100 is mechanically operated under pressure so that the first and second curved portions 120 and 130 and the extending portion 140 will open in a controlled way and avoid an explosive fracture of the can. In this case, the intersecting portion 110 is formed to have the minimum thickness of the recess in the surface 15, and is a portion at which the first and second curved portions 120 and 130 and the extending portion 140 intersect with one another. Hence, the intersecting portion 110 will have the lowest fracture pressure. Therefore, in a case where the vent portion 100 is forced to open under high pressure, the intersecting portion 110 will be the first portion to open. Subsequently, the first and second curved portions 120 and 130 and the extending portion 140 are fractured, and therefore, the entire vent portion 100 opens. In this case, the thicknesses of the first and second curved portions 120 and 130 and the extending portion 140 will influence the fracture pressure in a controlled manner. Accordingly, the thickness of the end 141 of the extending portion 140 is substantially identical to that of the end 121 or 131 of the first or second curved portion 120 or 130, thereby controlling the forces exerted on the lower portion of the battery enclosure and permitting a controlled fracture pressure of the vent portion 100.

The vent portion 100 according to this embodiment may include the first and second curved portions 120 and 130. The vent portion 100 is provided to the surface 15 of the secondary battery, e.g., the bottom surface of the secondary battery. Therefore, the vent portion 100 is preferably opened so that the electrode assembly provided inside the secondary battery is not exposed to the environment. However, where the vent portion 100 is controllably operated, gas is easily exhausted as the size of the opening increases. Thus, it is further advantageous in terms of the safety of the secondary battery by preventing uncontrolled fracturing and/or explosion. Therefore, in order to satisfy the two complementary effects, the vent portion 100 preferably opens into a final wide area yet at the same time the electrode assembly is not allowed to protrude through the housing. The vent portion 100 according to this embodiment may include the first and second curved portions 120 and 130. Where the vent portion 100 is caused to operate, i.e., to controllably open, the vent portion 100 is maintained to be extended to the surface 15 by the spacing distance between the ends 121 and 131 of the first and second curved portions 120 and 130. Thus, the electrode assembly will not protrude from the housing, and the vent portion 100 will open with a relatively wide area defined by the curved shape of the first and second curved portions 120 and 130, as compared with the vent portion that includes the straight line. Accordingly, when the internal pressure of the secondary battery increases, gas under high pressure will be effectively vented, thereby improving the safety of the secondary battery.

Hereinafter, other embodiments of the disclosed technology will be described with reference to FIGS. 4 and 5. It will be understood that descriptions of these embodiments, with the indicated exceptions, are similar to those of the embodiments described with reference to FIGS. 1 to 3, and therefore, certain portions of their detailed descriptions will be omitted.

Figure 4:
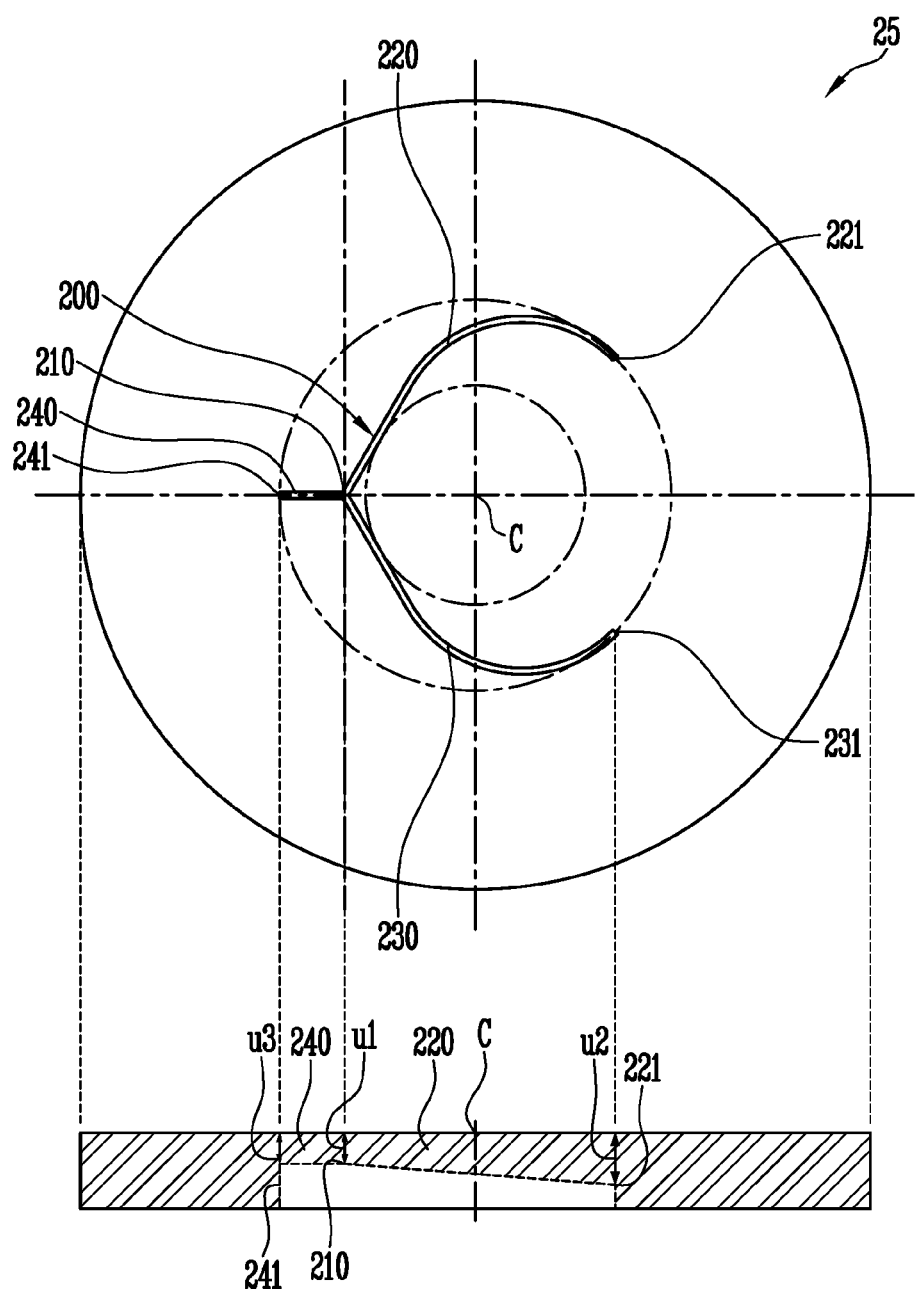
FIG. 4 is a view schematically showing a surface and a thickness gradient of a vent portion of the surface according to another embodiment of the present invention.

FIG. 4 is a view schematically showing a surface and a thickness gradient of a vent portion of the surface according to another embodiment of the disclosed technology.

The secondary battery according to this embodiment includes a surface 25 to which a vent portion 200 is provided. The vent portion 200 may include an intersecting portion 210, and first and second curved portions 220 and 230 and an extending portion 240, which are extended in a radial shape from the intersecting portion 210. In this case, the first and second curved portions 220 and 230 are provided to be curved in the opposite directions to each other, so that ends 221 and 231 of the first and second curved portions 220 and 230 face each other while being spaced apart from each other.

The vent portion 200 may be provided to be recessed inward from the outer surface of the surface 25. In this case, the inner surface of the surface 25, e.g., the surface facing the electrode assembly may be provided as a flat surface. Therefore, the vent portion 200 in the surface 25 may be provided to be relatively thinner than surroundings. In this case, the first thickness u1 of the intersecting portion 210 may be provided to be thinnest in the surface 25. The thickness of the section of the first or second curved portion 220 or 230 may be provided to be gradually increased from the first thickness u1 to the second thickness u2 of the intersecting portion 210 as the first or second round portion 220 or 230 approaches the end 221 or 231 thereof from the intersecting portion 210. In this case, the section of the extending portion 240 may be provided to have a third thickness u3. The third thickness u3 may be provided identical to the first thickness u1 of the intersecting portion 210.

The vent portion 200 according to this embodiment may be opened when the internal pressure of the secondary battery is a predetermined value or more. In this case, the intersecting portion 210 may be first operated. The intersecting portion 210 includes the minimum thickness as the first thickness u1, and is a portion at which the first and second curved portions 210 and 230 and the extending portion 240 intersect with one another. Hence, the intersecting portion 210 may have the lowest fracture pressure. Subsequently, the extending portion 240 having the third thickness u3 identical to the first thickness u1 that is the minimum thickness is operated, and the first and second curved portions 220 and 230 are then operated, thereby opening the vent portion 200.

The first or second curved portion 220 or 230 may be provided as the widest area in the vent portion 200. The first or second curved portion 220 or 230 may have the greatest influence on the opened area of the vent portion 200. On the other hand, the intersecting portion 210 and the extending portion 240 may have influence on the opened area of the vent portion 200 as areas relatively smaller than the first and second curved portions 220 and 230. That is, the extending portion 240 and the first or second curved portion 220 or 230 have a difference in operational pressure therebetween, and therefore, the extending portion 240 and the first or second curved portion 220 or 230 may be operated with a time difference (or internal pressure difference of the secondary battery). Accordingly, the degree of opening of the vent portion 200 can be controlled according to the difference in operational pressure between the extending portion 240 and the first or second curved portion 220 or 230, thereby precisely controlling the vent portion 200.

Figure 5:
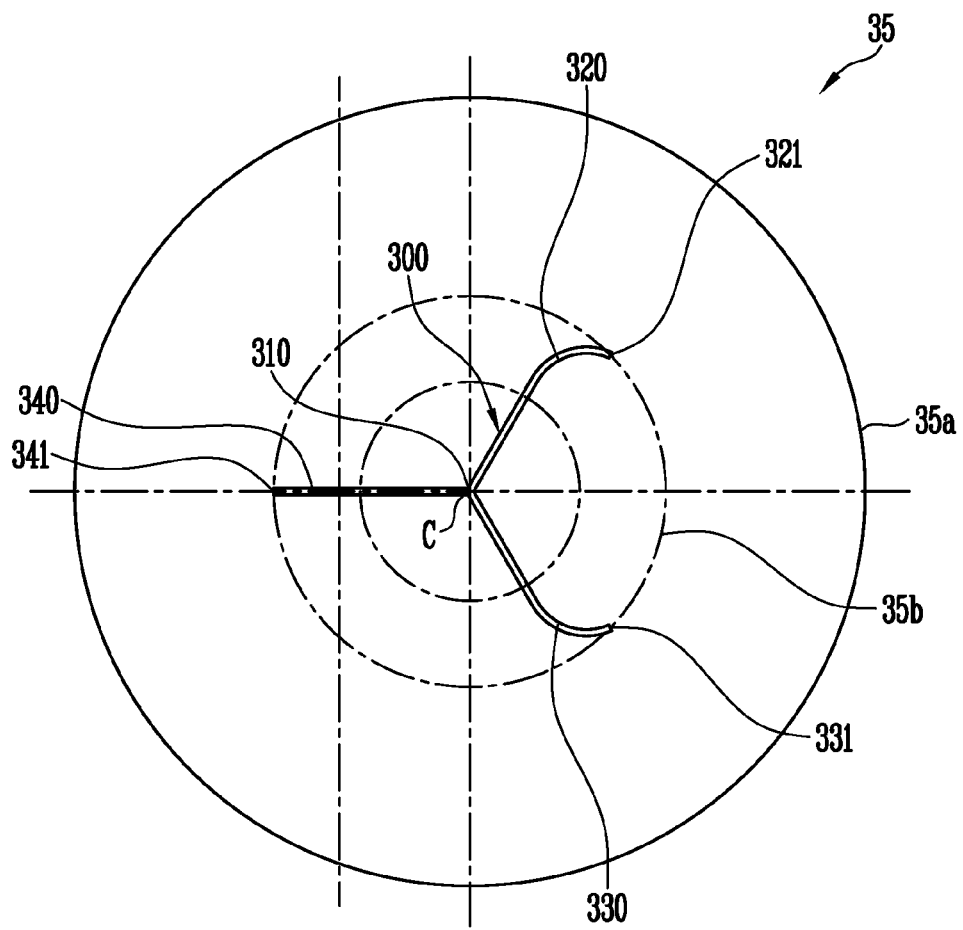
FIG. 5 is a view showing a surface according to still another embodiment of the disclosed technology.

FIG. 5 is a view showing a surface according to still another embodiment of the disclosed technology.

The secondary battery according to this embodiment may have a vent portion 300 provided to the surface 35, e.g., the bottom surface thereof. The vent portion 300 may be provided to be recessed inward from the outer surface of the surface 35. The vent portion 300 may be provided to have a thickness that is thinnest in the surface 35. The vent portion 300 may include an intersecting portion 310, and first and second curved portions 320 and 330 and an extending portion 340, which are extended in a radial shape from the intersecting portion 310. The intersecting portion 310 may have a thickness that is thinnest in the surface 35.

For example, the secondary battery according to this embodiment may be a secondary battery having a circular section, and the surface 35 may be provided in a circular shape having a center C. In this case, the intersecting portion 310 may be provided at the center C of the surface 35. Therefore, the first and second curved portions 320 and 330 and the extending portion 340 may be extended in a radial shape at the center C of the surface 35. The straight line distance obtained by connecting the intersecting portion 310 to an end 321 or 331 of the first or second curved portion 320 or 330 may be identical to that obtained by connecting the intersecting portion 310 to an end 341 of the extending portion 340. For example, when the corner of the surface 35 is referred to as an outer circle 35a, the closed curve obtained by connecting the end 341 of the extending portion 340 and the ends 321 and 331 of the first and second curved portions 320 and 330 may correspond to an inner circle 35b. The inner circle 35b is formed inside the outer circle 35a and shares the center C with the outer circle 35a while being spaced apart from the outer circle 35a at a predetermined interval.

The intersecting portion 310 includes the minimum thickness of the surface 35, and is a portion at which the first and second curved portions 320 and 330 and the extending portion 340 intersect with one another. Hence, the intersecting portion 310 may have the lowest fracture pressure with respect to the internal pressure of the secondary battery. Therefore, the intersecting portion 310 may be first operated in the vent portion 300. Accordingly, the intersecting portion 310 is provided at the center C of the surface 35, so that the fracture of the vent portion 300 can be controlled to be started at the center C of the surface 35.

Certain embodiments provide a secondary battery comprising a can; and a vent portion formed at the base of the can having a plurality of fracture lines meeting at a point and at least one of the fracture lines having a varying thickness. The fracture lines include at least one straight line and at least two curved lines. The vent portion is formed as a recess in the bottom surface of the can. The secondary battery further comprises a cap assembly affixed to the top of the can. The secondary battery further comprises positive and negative electrodes and an electrolyte.

As described above, according to the disclosed technology, embodiments of a secondary battery with the disclosed vent will have improved safety. While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A secondary battery, comprising:
   an electrode assembly having a first electrode plate, a second electrode plate and a separator interposed between the first and second electrode plates;
   a lower case accommodating the electrode assembly therein; and
   a cap assembly sealing the lower case,
   wherein the lower case surrounds the electrode assembly and includes a surface facing the cap assembly and having a vent portion,
   wherein the vent portion includes an intersecting portion formed on the surface, first and second curved portions that are formed to extend from the intersecting portion, and an extending portion extended in a line from the intersecting portion,
   wherein the thickness of the intersecting portion has the minimum thickness of the surface,
   wherein the first and second curved portions extend toward the outer perimeter of the surface from the intersecting portion, and
   wherein the first and second curved portions are curved so that ends of the first and second curved portions face each other while being spaced apart from each other.

2. The secondary battery of claim 1, wherein an end of the extending portion is extended toward the opposite direction to the ends of the first and second curved portions.

3. The secondary battery of claim 2, wherein the intersecting portion and the extending portion are formed to correspond to a center line of the surface.

4. The secondary battery of claim 2, wherein the first and second curved portions are formed to have a pair of shapes corresponding to each other with the center line interposed therebetween.

5. The secondary battery of claim 2,
wherein the secondary battery is a cylindrical secondary battery,
wherein an outline of the surface forms an outer circle, a closed curve obtained by connecting the end of the extending portion and the ends of the first and second curved portions corresponds to an inner circle, and
wherein the inner circle is concentrically formed inside the outer circle and spaced apart from the outer circle at a predetermined distance.

6. The secondary battery of claim 5, wherein the radius of the inner circle is about half of that of the outer circle.

7. The secondary battery of claim 1, wherein the thickness of the section of the first or second curved portion is formed to be inclined in the direction facing the end of the first or second curved portion from the intersecting portion.

8. The secondary battery of claim 7, wherein the extending portion is formed in a straight line.

9. The secondary battery of claim 8, wherein the extending portion is formed to overlap with the center line of the surface.

10. The secondary battery of claim 8, wherein the thickness of the section of the extending portion is formed to be inclined in the direction facing the end of the extending portion from the intersecting portion.

11. The secondary battery of claim 10, wherein the thickness of the end of the extending portion is formed to be substantially identical to that of the end of the first or second curved portion.

12. The secondary battery of claim 8, wherein the thickness of the section of the extending portion is formed to be substantially identical to that of the intersecting portion.

13. The secondary battery of claim 1, wherein the intersecting portion is formed at the substantial center of the surface.

14. The secondary battery of claim 1, wherein the vent portion recessed inward is formed to the outer surface of the surface, and the inner surface of the surface is formed as a flat surface.

* * * * *